(12) United States Patent
Scoda et al.

(10) Patent No.: US 9,971,636 B2
(45) Date of Patent: May 15, 2018

(54) METHODS FOR IMPLEMENTING WEB SERVICES AND DEVICES THEREOF

(75) Inventors: Enrico Scoda, Martignacco (IT); Marco Brondani, Udine (IT)

(73) Assignee: UsableNet Inc., New York, NY (US)

( * ) Notice: Subject to any disclaimer, the term of this patent is extended or adjusted under 35 U.S.C. 154(b) by 735 days.

(21) Appl. No.: 13/534,151

(22) Filed: Jun. 27, 2012

(65) Prior Publication Data

US 2012/0331110 A1 Dec. 27, 2012

Related U.S. Application Data

(60) Provisional application No. 61/501,391, filed on Jun. 27, 2011.

(51) Int. Cl.
*G06F 15/16* (2006.01)
*G06F 9/54* (2006.01)

(52) U.S. Cl.
CPC .................. *G06F 9/541* (2013.01)

(58) Field of Classification Search
CPC ......... G06F 9/06; G06F 21/00; G06F 17/2247
USPC ........................................................ 709/219
See application file for complete search history.

(56) References Cited

U.S. PATENT DOCUMENTS

| | | | | |
|---|---|---|---|---|
| 7,072,984 B1 * | 7/2006 | Polonsky et al. | ............ | 709/246 |
| 8,019,884 B2 * | 9/2011 | Manning et al. | ............ | 709/231 |
| 8,055,767 B1 * | 11/2011 | Forristal | ....................... | 709/224 |
| 8,078,759 B2 * | 12/2011 | Seifert | ............ | G06F 17/30899 709/232 |
| 8,276,190 B1 * | 9/2012 | Chang | ................. | H04L 63/0815 713/176 |
| 8,407,584 B1 * | 3/2013 | Boodman et al. | ............ | 715/234 |
| 8,601,586 B1 * | 12/2013 | Boutros | ............. | H04L 63/1433 709/217 |
| 9,047,234 B1 * | 6/2015 | Nara | ....................... | G06F 15/16 |
| 2002/0073197 A1 * | 6/2002 | Bhogal | ................... | H04L 29/06 709/224 |
| 2004/0045004 A1 * | 3/2004 | Cheenath | ............... | G06F 9/547 719/310 |
| 2005/0152344 A1 * | 7/2005 | Chiu | ................... | H04M 3/4938 370/352 |

(Continued)

OTHER PUBLICATIONS

International Search Report for International Patent Application No. PCT/US12/44395 (dated Dec. 28, 2012).

(Continued)

*Primary Examiner* — Kevin T Bates
*Assistant Examiner* — Ronak Patel
(74) *Attorney, Agent, or Firm* — LeClairRyan PLLC (57) ABSTRACT

A method, non-transitory computer readable medium, and apparatus that determines when a JavaScript file is associated with a received web service request. A JavaScript environment is emulated when the determining indicates the JavaScript file is associated with the received web service request. A JavaScript object including one or more parameters of the received web service request is created. The JavaScript file associated with the received web service request is executed in the emulated JavaScript environment using the JavaScript object. A web service response is constructed based on the JavaScript object as populated based on the executing. The constructed web service response is provided to a source of the received web service request.

21 Claims, 5 Drawing Sheets

(56) References Cited

U.S. PATENT DOCUMENTS

| | | | |
|---|---|---|---|
| 2005/0216582 A1* | 9/2005 | Toomey | H04L 63/0807 709/224 |
| 2006/0031404 A1 | 2/2006 | Kassab | |
| 2006/0112398 A1* | 5/2006 | Mukkamala et al. | 719/316 |
| 2006/0206559 A1 | 9/2006 | Xie et al. | |
| 2007/0022199 A1* | 1/2007 | Tatsubori | H04L 67/2804 709/227 |
| 2007/0073769 A1* | 3/2007 | Baikov | H04L 67/02 |
| 2007/0150610 A1* | 6/2007 | Vassilev et al. | 709/230 |
| 2008/0148397 A1* | 6/2008 | Litvin | G06Q 10/107 726/22 |
| 2008/0163168 A1 | 7/2008 | Huang | |
| 2008/0183902 A1* | 7/2008 | Cooper et al. | 709/250 |
| 2008/0201452 A1* | 8/2008 | Athas | H04L 29/12594 709/219 |
| 2009/0007253 A1* | 1/2009 | Chung | H04L 63/168 726/12 |
| 2009/0013310 A1* | 1/2009 | Arner | G06F 8/38 717/120 |
| 2009/0172792 A1* | 7/2009 | Backhouse | G06F 21/33 726/6 |
| 2010/0223544 A1* | 9/2010 | Haldimann | G06F 9/542 715/234 |
| 2010/0325195 A1* | 12/2010 | Kamp | H04L 67/16 709/203 |
| 2011/0015917 A1* | 1/2011 | Wang | G06F 9/455 703/23 |
| 2011/0016449 A1 | 1/2011 | Yao et al. | |
| 2011/0099467 A1 | 4/2011 | Kapur et al. | |
| 2011/0219446 A1* | 9/2011 | Ichnowski | H04L 63/1441 726/22 |
| 2011/0231479 A1* | 9/2011 | Boydstun | H04L 67/2814 709/203 |
| 2011/0296036 A1* | 12/2011 | Canning et al. | 709/228 |
| 2011/0307238 A1* | 12/2011 | Scoda | 703/26 |
| 2011/0321022 A1* | 12/2011 | Soundrapandian | G06F 9/547 717/163 |
| 2012/0096068 A1* | 4/2012 | Canning et al. | 709/203 |
| 2012/0137210 A1* | 5/2012 | Dillon | G06F 17/30902 715/234 |
| 2012/0144316 A1* | 6/2012 | Deng | G06Q 30/02 715/751 |
| 2012/0185310 A1* | 7/2012 | Greenspun | G06Q 30/0209 705/14.12 |

OTHER PUBLICATIONS

Squires, "Create Node.JS Web-Services in One Line", Sep. 24, 2010, pp. 1-9, Ghost, New York, NY.

International Search Report for International Patent Application No. PCT / US12 / 44395 (dated Mar. 17, 2016).

European Office Action for EP Application No. 12 04 434.4, dated Feb. 14, 2017, pp. 1-6.

* cited by examiner

```
function service(webService) {
    $('body').load('https://samplesite.com/login.html', null, function(responseText, status, xhr) {
        $('#user').val(webService.params['username']);
        $('#passwd').val(webService.params['password']);
        var form = $('#login');
        $.post(form.attr('action'), form.serialize(), function(responseText, status, xhr) {
            $('body').html(responseText);
            webService.contentType = 'text/xml';
            webService.response = '<message>' + $('body div').text() + '</message>';
        });
    });
}
```

FIG. 5

METHODS FOR IMPLEMENTING WEB SERVICES AND DEVICES THEREOF

CROSS-REFERENCE TO RELATED APPLICATIONS

This application claims the benefit of U.S. Provisional Patent Application Ser. No. 61/501,391, filed Jun. 27, 2011, which is hereby incorporated by reference in its entirety.

BACKGROUND

Web services provide a standardized way of integrating web-based applications using eXtensible Markup Language (XML), SOAP, Web Services Description Language (WSDL), and/or Universal Description Discovery and Integration (UDDI) standards over an Internet Protocol (IP) backbone. XML can be used to tag data used by a web service, SOAP can be used to transfer the data, WSDL can be used for describing the web services available and UDDI can be used for listing the available web services. Web services allow different applications located at different sources to communicate with each other efficiently and without custom coding which can require a significant amount of resources. Additionally, because communications are in XML, web services are not tied to any operating system or programming language.

Unlike traditional client/server models, web services do not provide an end user with a graphical user interface (GUI). Instead, web services share data and processes through an application interface across a network. These application interfaces are invoked and used to interpret any resulting data.

With the growing market for applications, web services are increasingly popular since it is easy to integrate them into applications to extend the features offered to the end user. Unfortunately, there are limitations on the ability of mobile computing devices to effectively utilize web services integrated into such applications including, for example, with respect to the execution of functionality implemented using JavaScript code.

SUMMARY

A method for implementing a web service includes determining with a web content proxy server when a JavaScript file is associated with a received web service request. A JavaScript environment is emulated with the web content proxy server when the determining indicates the JavaScript file is associated with the received web service request. A JavaScript object including one or more parameters of the received web service request is created with the web content proxy server. The JavaScript file associated with the received web service request is executed with the web content proxy server in the emulated JavaScript environment using the JavaScript object. The emulated JavaScript environment is capable of facilitating execution of web transactions including one or more pages. A web service response is constructed with the web content proxy server based on the JavaScript object as populated based on the executing. The constructed web service response is provided with the web content proxy server to a source of the received web service request.

A non-transitory computer readable medium having stored thereon instructions for implementing a web service comprising machine executable code which when executed by at least one processor, causes the processor to perform steps including determining whether a JavaScript file is associated with a received web service request. A JavaScript environment is emulated when it is determined that there is a JavaScript file associated with the received web service request. A JavaScript object including one or more parameters of the received web service request is created. The JavaScript file associated with the received web service request is executed in the emulated JavaScript environment using the JavaScript object. The emulated JavaScript environment is capable of facilitating execution of web transactions including one or more pages. A web service response is constructed based on the JavaScript object as populated based on the executing. The constructed web service response is provided to a source of the received web service request.

A web content proxy server includes one or more processors and a memory coupled to the one or more processors which are configured to execute programmed instructions stored in the memory including determining whether a JavaScript file is associated with a received web service request. A JavaScript environment is emulated when it is determined that there is a JavaScript file associated with the received web service request. A JavaScript object including one or more parameters of the received web service request is created. The JavaScript file associated with the received web service request is executed in the emulated JavaScript environment using the JavaScript object. The emulated JavaScript environment is capable of facilitating execution of web transactions including one or more pages. A web service response is constructed based on the JavaScript object as populated based on the executing. The constructed web service response is provided to a source of the received web service request.

This technology provides a number of advantages including providing methods and devices for more easily implementing web services with a web content proxy server executing a web service automator module and JavaScript environment emulator. With this technology, web services can be more effectively extended and utilized by mobile computing devices that may not otherwise be capable of exploiting such functionality.

DETAILED DESCRIPTION

Figure 1:
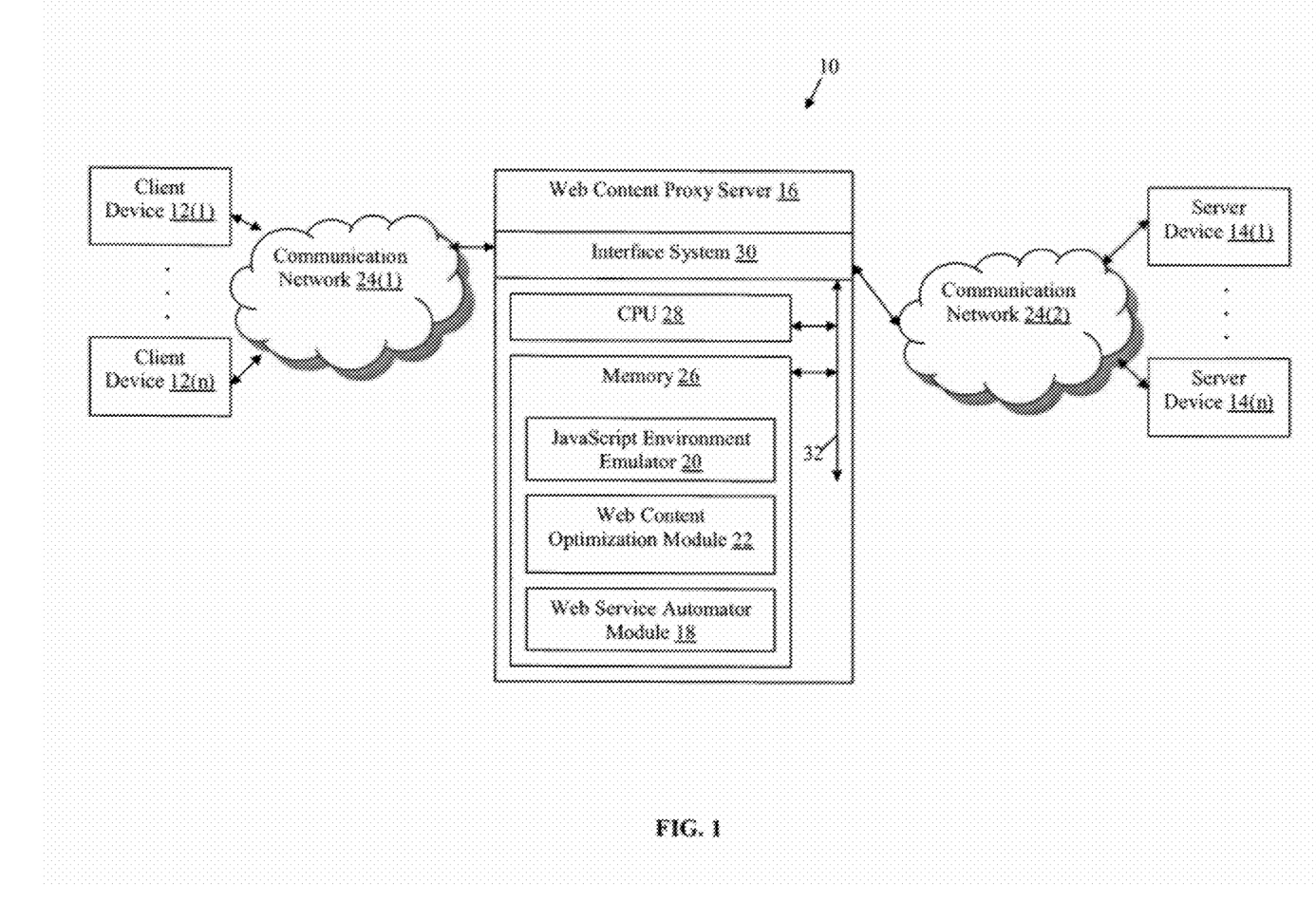
FIG. 1 is a block diagram of an environment with an exemplary web content proxy server with a web content optimization module, web service automator module, and a JavaScript environment emulator.

An exemplary environment 10 with client devices 12(1)-12(n), server devices 14(1)-14(n), and web content proxy server 16, including a web service automator module 18, a JavaScript environment emulator 20, and a web content optimization module 22, coupled to communication networks 24(1)-24(2) is illustrated in FIG. 1. Other numbers and types of systems, devices, and/or elements in other configurations and environments with other communication network topologies can also be used. By way of example only, the web service automator module 18, JavaScript environment emulator 20, and/or web content optimization module 22 can be implemented as an executable module of programmed instructions for one or more of the methods described herein which is stored in a memory 26 and executed by one or more processors or CPUs 28 in the web content proxy server 16. This technology provides a number of advantages including providing methods, non-transitory computer readable medium, and devices for more easily and effectively implementing web services on behalf of mobile computing devices.

Referring more specifically to FIG. 1, the web content proxy server 16 includes a central processing unit (CPU) 28 or processor, a memory 26, and an interface system 30 which are coupled together by a bus 32 or other link, although other numbers and types of components, parts, devices, systems, and elements in other configurations and locations can be used. The processor 28 in the web content proxy server 16 executes a program of stored instructions one or more aspects of the present invention as described and illustrated by way of the embodiments herein, although the processor 28 could execute other numbers and types of programmed instructions.

The memory 26 in the web content proxy server 16 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 28, can be used for the memory 26 in the web content proxy server 16. In some embodiments, the memory 26 includes a web service automator module 18, a JavaScript environment emulator 20, and a web content optimization module 22 comprising programmed instructions and/or configurable hardware logic for one or more aspects of the present invention as described and illustrated herein, although the memory 26 can comprise other types and numbers of systems, devices, and elements in other configurations which store other data.

The web service automator module 18 can include programmed instructions and/or logic configured to facilitate one or more of the methods described and illustrated in detail below including receiving a web service request from one of the client devices 12(1)-12(n) and providing a web service response. The JavaScript environment emulator 20 can include programmed instructions and/or logic configured to simulate a JavaScript environment for executing one or more JavaScript files, as described and illustrated in more detail below. The web content optimization module can include programmed instructions and/or logic configured to extract content relevant to a requesting client device 12(1)-12(n) and adapt, transform, or otherwise modify this extracted content to fit the specifications of the requesting client device 12(1)-12(n). One or more of the web service automator module 18, the JavaScript environment emulator 20, or the web content optimization module 22 can also have other types and numbers of functions as described and illustrated herein. Additionally, one or more of the web service automator module 18, the JavaScript environment emulator 20, or the web content optimization module 22 can be stored at and/or implemented by a separate device coupled to the web content proxy server 16 by one or more of the communication networks 24(1)-24(2), for example.

The interface system 30 in the web content proxy server 16 is used to operatively couple and communicate between the web content proxy server 16, the client devices 12(1)-12(n) and the server devices 14(1)-14(n) via the communication networks 24(1)-24(2), although other types and numbers of communication networks 24(1)-24(2) with other types and numbers of connections and configurations can be used. Additionally, one or more of the communication networks 24(1)-24(2) can include one or more networks, such as one or more local area networks (LANs) and/or wide area networks (WANs). By way of example only, the communication networks can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used.

The client devices 12(1)-12(n) enable a user to request, receive, and interact with applications, web services, and content hosted by the server devices 14(1)-14(n) through the web content proxy server 16 via one or more communication networks 24(1), although one or more of the client devices 12(1)-12(n) could access content and utilize other types and numbers of applications from other sources and could provide a wide variety of other functions for the user. In some examples, the client devices 12(1)-12(n) comprise mobile computing devices with Internet access that enable one or more web services to be accessed. By way of example only, the client devices 12(1)-12(n) can be smart phones, personal digital assistants, or computers.

In some examples, the client devices 12(1)-12(n) include a central processing unit (CPU) or processor, a memory, a user input device, a display, and an interface system, which are coupled together by a bus or other link, although one or more of client devices 12(1)-12(n) can include other numbers and types of components, parts, devices, systems, and elements in other configurations. The processor in the client devices 12(1)-12(n) can execute a program of instructions stored in the memory of the client device 12(1)-12(n) for one or more aspects of the present invention as described and illustrated herein, although the processor could execute other numbers and types of programmed instructions.

The user input device in the client devices 12(1)-12(n) can be used to input selections, such as a request for a particular web service, although the user input device could be used to input other types of requests and data and interact with other elements. The user input device can include keypads, touch screens, and/or vocal input processing systems although other types and numbers of user input devices can be used.

The display the client device can be used to show data and information to the user, such as a response to the web service request by way of example only. The display in the client device is a phone screen display, although other types and numbers of displays could be used depending on the particular type of client device.

The interface system in the client devices 12(1)-12(n) can be used to operatively couple and communicate between the client devices 12(1)-12(n), the web content proxy server 16, and the server devices 14(1)-14(n) over the communication networks 24(1)-24(2).

The server devices 14(1)-14(n) provide content including web pages for use by one or more of the client devices 12(1)-12(n) via the web content proxy server 16, although the server devices 14(1)-14(n) can provide other numbers and types of functions.

Each of the server devices 14(1)-14(n) can include a central processing unit (CPU) or processor, a memory, and an interface system which are coupled together by a bus or other link, although each of the web server devices 14(1)-14(n) could have other numbers and types of components, parts, devices, systems, and elements in other configurations and locations. The processor in each of the server devices 14(1)-14(n) executes a program of instructions stored in the memory of the server devices 14(1)-14(n) for one or more aspects of the present invention as described and illustrated by way of the embodiments herein, although the processor could execute other numbers and types of programmed instructions.

The interface system in each of the server devices 14(1)-14(n) is used to operatively couple and communicate between the server devices 14(1)-14(n), the web content proxy server 16, and the client devices 12(1)-12(n) via communication networks 24(1)-24(2).

Although embodiments web content proxy server 16, the client devices 12(1)-12(n), and the server devices 14(1)-14(n), are described and illustrated herein, each of the web content proxy server 16, the client devices 12(1)-12(n), and the server devices 14(1)-14(n), can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary method for implementing web services will now be described below. This technology defines methods, non-transitory computer readable medium, and devices to implement web services using web site(s) and/or web page(s), and associated content and/or source code as the source data, to produce results including one or more web service responses. Additionally, as many web sites depend on web cookies as a way to store and keep the state of a transaction or session, web services implemented as described with this technology can extend the standard web service definition to include web cookies to keep the mapping between web services and a web site data source.

This technology also utilizes a JavaScript environment emulator 20 configured to make asynchronous JavaScript and XML (Ajax) calls and to execute web site transactions corresponding to the functionality implemented by web services. By way of example only, a JavaScript environment emulator 20 in a web content proxy server 16 is illustrated and described in U.S. patent application Ser. No. 12/802,670 entitled, "Methods For Utilizing A JavaScript Emulator In A Web content proxy Server And Devices Thereof" which is herein incorporated by reference in its entirety.

As illustrated in FIG. 1, the web service automator module 18 can be an application comprising programmed instructions as described and illustrated herein and executed by the web content proxy server 16 that interacts with one of the client devices 12(1)-12(n) making a web service request and server device(s) 14(1)-14(n) acting as the source data for the web service, although other configurations can be used. By way of example, the web service automator module 18 can be a module in memory 26 executed by the web content proxy server 16. Optionally, the web content proxy server 16 can further execute the web content optimization module 22 which can be used as a "preprocessor" that modifies web content before the content is passed to the web service automator module 18.

Figure 2:
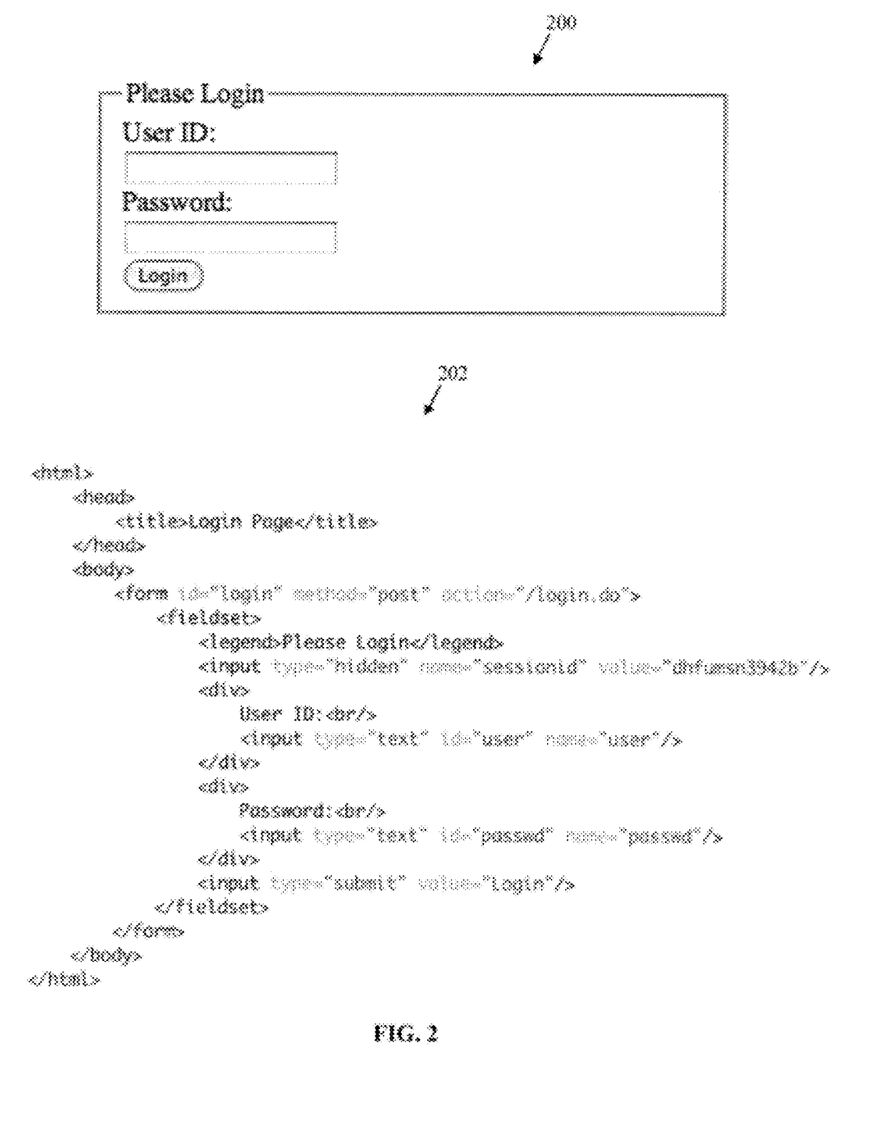
FIG. 2 is an exemplary login page, such as may be located at a *.login.html web address, and its hypertext markup language (HTML) source code.

Referring to FIG. 2, a diagram of an exemplary login page 200, such as may be located at a *login.html uniform resource locator (URL) or web address, where "*" is a wild card referring to a host name and/or one or more higher level domains, for example, and its HTML source code 202, is shown. The HTML source code 202 includes a form pointing to a /login.do script and having a "sessionid" hidden field, "user" and "passwd" text fields for receiving inserted login credentials, and a submit button labeled "Login".

Figure 3:
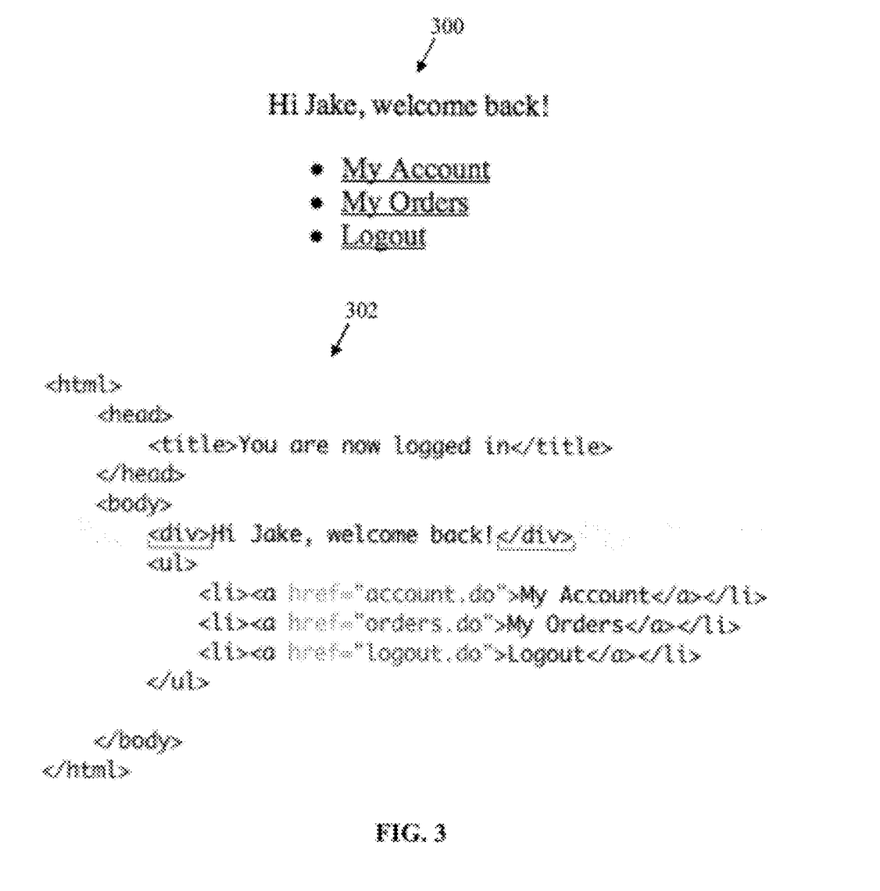
FIG. 3 is an exemplary successful login page including a welcome message and a list of links to access different functionalities and logout and its HTML source code.

When a user of one of the client devices 12(1)-12(n) submits valid login credentials and engages the "Login" submit button on the web page 200 with a user input device, the user can receive a web page, such as the exemplary web page 300 shown in FIG. 3. The web page 300 includes a welcome message and a list of links to access different functionalities and logout.

Further illustrated in FIG. 3 is the HTML source code 302 associated with the successful login web page 300. Upon submission of the form, the submitted values for the "user" and "passwd" fields will be communicated along with the value for the hidden "sessionid" field. Optionally, the responding device, such as one of the server devices 14(1)-14(n), can use a set-cookie header populated with the "sessionid" field value (e.g. sessionid=dhfumsn3942b) as a cookie to store identification information for the session. Accordingly, in this example, an expected web service response for a submission including a valid username and password is XML data that can be rendered in a browser of the client device 12(1)-12(n) and which includes a welcome message for the validated user such as "<message>welcome message . . . </message>".

Figure 4:
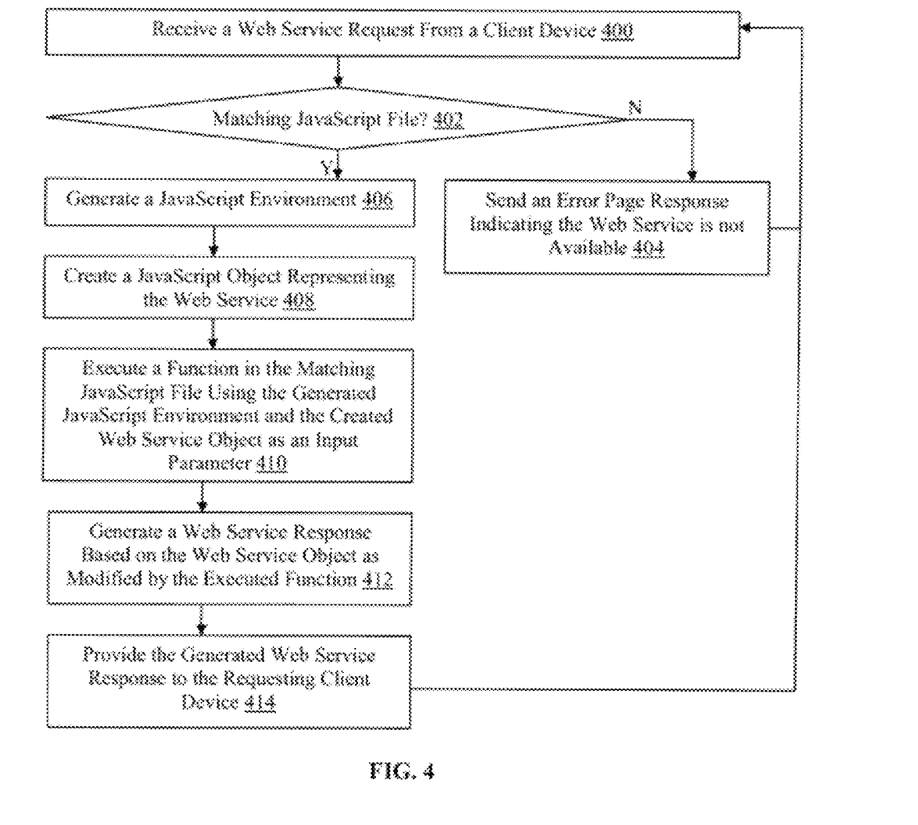
FIG. 4 is a flow chart of an exemplary method for implementing web services.

Referring to FIG. 4, an exemplary method for implementing a web service is illustrated. In step 400, the web content proxy server 16 executing the web service automator module 18 receives a web service request from one of the client devices 12(1)-12(n). Referring to a web service implementation of the login process illustrated in FIGS. 2 and 3, the received web service request can be associated with a URL such as "https://processor.com/ws/samplesite/login?username=jake&password=123", where processor.com is the web site hosting the web service, /ws/ is a web application running a web service engine, samplesite/login is a URL substring identifying the web service, and the username and password are the two parameters of the web service. While the username and password are shown in this exemplary URL, the user name and password parameter values can be hidden using techniques that are well-known in the art.

In step 402, the web content proxy server 16 executing the web service automator module 18 determines whether there is a JavaScript file corresponding to the web service. Accordingly, in the above example, the web content proxy server 16 executing the web service automator module 18 determines whether there is a project in the memory called "samplesite" which contains a JavaScript file called "login.js". If the web content proxy server 16 executing the web service automator module 18 determines that the identified JavaScript file does not exist, then a No branch is taken to step 404. In step 404, the web content proxy server 16 executing the web service automator module 18 sends an error page web service response to the requesting one of the client devices 12(1)-12(n) indicating the web service is not available.

If the web content proxy server 16 executing the web service automator module 18 determines that the identified JavaScript file does exist, then a Yes branch is taken to step 406. In step 406, the web content proxy server 16 executing the web service automator module 18 communicates with the JavaScript environment emulator 20 in order to generate a JavaScript environment, such as illustrated and described by way of example only in U.S. patent application Ser. No. 12/802,670 which is herein incorporated by reference in its entirety.

Figure 5:
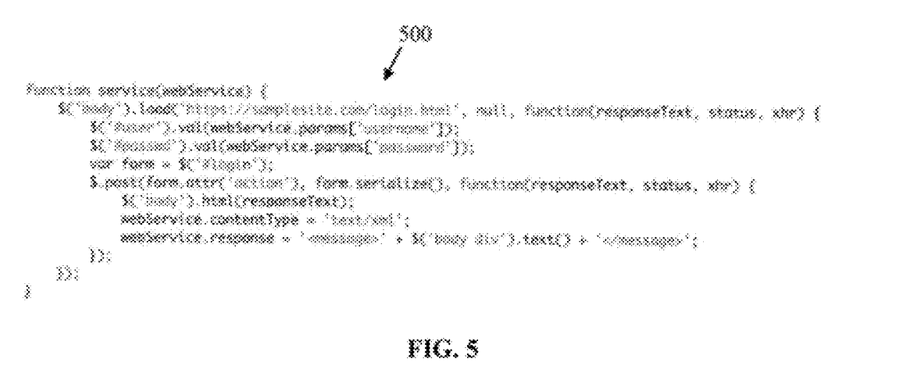
FIG. 5 is exemplary JavaScript code for implementing a function facilitating generation of a web service response.

In step 408, the web content proxy server 16 executing the web service automator module 18 creates a JavaScript object representing the web service, although the object can be generated in other manners. With reference to FIG. 5, in which JavaScript code 500 for implementing a function facilitating generation of a web service response is shown, the JavaScript object can be named "webService", although other names can also be used. In this example, the created JavaScript object contains the parameters of the web service request (e.g. user name and password values), as retrieved from the URL and/or through HTTP GET and/or POST commands, for example.

In step 410, the web content proxy server 16 executing the JavaScript environment emulator 20 executes a function in the matching JavaScript file identified in step 402. In the example shown in FIG. 5, the function is named "service", although other functions and/or names, the identity of which is known by the web content proxy server 16, can also be used. The function is executed using the environment generated in step 406 and the created web service object as an input parameter. In this example, the "service" function uses a library, such as jQuery, that simplifies the use of Ajax inside the JavaScript environment in the JavaScript environment emulator 20 of the web content proxy server 16, although any other functions or libraries can also be used.

The executed function is responsible for populating the created web service object (e.g. the "webService" object), with the necessary data to construct a web service response.

The exemplary "service" function shown in the JavaScript code of FIG. 5 retrieves the login.html page from the responding one of the server devices 14(1)-14(n). Next, the "service" function fills the login.html form text fields with the parameters passed to the function as contained by the web service object input parameter (e.g. "webService"). Once filled, the "service" function submits the form data to the "login.do" script indicated by the form action in the HTML source code 202, simulating submission of the form by the requesting one of the client devices 12(1)-12(n). The "login.do" script can, for example, validate the user name and password parameter values, although any other functionality can also be provided.

In step 412, the web content proxy server 16 executing the web service automator module 18 generates a web service response based on the input web service object, as modified by the executed function. Accordingly, in the example shown in FIG. 5, the "service" function further sets a "response" property of the "webService" web service object to include "<message>" and "</message>" XML tags with a text message (e.g. "Hi Jake, welcome back!") inserted between the tags. Any other XML tags, or any other code capable of being interpreted by the web service automator module 18, and/or the browser of the requesting one of the client devices 12(1)-12(n), can be used to populate the web service object. Additionally, any other web service functionality can be provided by the JavaScript code 500. Accordingly, the web content proxy server 16 executing the web service automator module 18 inspects the web service object returned from, and as modified by, the JavaScript environment emulator 20, and generates the web service response.

In step 414, the web content proxy server 16 executing the web service automator module 18 provides the generated web service response to the requesting one of the client devices 12(1)-12(n). The response is in a form that can be rendered by the requesting one of the client devices 12(1)-12(n). Optionally, the web content proxy server 16 executing the web service automator module 18 includes a cookie, such as a cookie including the sessionid information in this example, in order to maintain the state of the session between the requesting one of client devices 12(1)-12(n) and the responding one of the server devices 14(1)-14(n).

Accordingly, as illustrated and described herein this technology provides a number of advantages including providing methods, non-transitory computer readable medium, and devices for more easily implementing web services with a web content proxy server. With this technology, a web content proxy server can implement a web service thereby allowing mobile computing devices to send and receive web service requests and responses even though the devices may not be capable of performing such functionality. Thereby, web services can be more effectively extended and utilized by mobile computing devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for implementing a web service, the method comprising:
   determining by a web content proxy server when a JavaScript file is associated with a received web service request based on a match of the JavaScript file with a portion of a uniform resource locator (URL) associated with the web service request;
   emulating by the web content proxy server a JavaScript environment when the determining indicates the JavaScript file is associated with the received web service request;
   creating by the web content proxy server a JavaScript object including one or more parameters of the received web service request;
   executing by the web content proxy server the JavaScript file associated with the received web service request in the emulated JavaScript environment by passing the created JavaScript object including the one or more parameters of the received web service request to a function in the JavaScript file;
   constructing by the web content proxy server a web service response based on the JavaScript object as populated based on the executing; and
   providing by the web content proxy server the constructed web service response to a source of the received web service request.

2. The method as set forth in claim 1 further comprising setting by the web content proxy server one or more cookies based on the constructed web service response.

3. The method as set forth in claim 1 further comprising providing by the web content proxy server an error message to the source of the received web service request as a web service response when there is no determined JavaScript file associated with the received web service request.

4. The method as set forth in claim 1 wherein the web content proxy server comprises at least one of a web service automator module, a web content optimization module, or a JavaScript environment emulator.

5. The method as set forth in claim 4 wherein the JavaScript environment emulator is configured to make asynchronous JavaScript and XML (Ajax) calls and execute web site transactions corresponding to functionality implemented by one or more web services.

6. The method as set forth in claim 1 wherein the received web service request comprises at least one of a GET HTTP request, a POST HTTP request, a PUT HTTP request, or a DELETE HTTP request; and
   wherein the one or more parameters of the received web service request comprises a user name value or a password value.

7. The method as set forth in claim 1 wherein the received web service request and the constructed web service response contain cookie and set-cookie headers, respectively.

8. A non-transitory computer readable medium having stored thereon instructions for implementing a web service comprising machine executable code which when executed by at least one processor, causes the processor to perform steps comprising:
   determining when a JavaScript file is associated with a received web service request based on a match of the JavaScript file with a portion of a uniform resource locator (URL) associated with the web service request;
   emulating a JavaScript environment when the determining indicates the JavaScript file is associated with the received web service request;
   creating a JavaScript object including one or more parameters of the received web service request;
   executing the JavaScript file associated with the received web service request in the emulated JavaScript environment by passing the JavaScript object including the one or more parameters of the received web service request to a function in the JavaScript file;
   constructing a web service response based on the JavaScript object as populated based on the executing; and
   providing the constructed web service response to a source of the received web service request.

9. The medium as set forth in claim 8 further having stored thereon machine executable code that when executed by the at least one processor causes the processor to perform one or more steps further comprising setting one or more cookies based on the constructed web service response.

10. The medium as set forth in claim 8 further having stored thereon machine executable code that when executed by the at least one processor causes the processor to perform one or more steps further comprising providing an error message to the source of the received web service request as a web service response when there is no determined JavaScript file associated with the received web service request.

11. The medium as set forth in claim 8 wherein the received web service request comprises at least one of a GET HTTP request, a POST HTTP request, a PUT HTTP request, or a DELETE HTTP request; and
    wherein the one or more parameters of the received web service request comprises a user name value or a password value.

12. The medium as set forth in claim 8 wherein the received web service request and the constructed web service response contain cookie and set-cookie headers, respectively.

13. A web content proxy server apparatus, comprising:
    one or more processors; and
    a memory coupled to the one or more processors which are configured to execute programmed instructions comprising and stored in the memory to:
    determine when a JavaScript file is associated with a received web service request based on a match of the JavaScript file with a portion of a uniform resource locator (URL) associated with the web service request;
    emulate a JavaScript environment when the determining indicates the JavaScript file is associated with the received web service request;
    create a JavaScript object including one or more parameters of the received web service request;
    execute the JavaScript file associated with the received web service request in the emulated JavaScript environment by passing the JavaScript object including the one or more parameters of the received web service request to a function in the JavaScript file;
    construct a web service response based on the JavaScript object as populated based on the executing; and
    provide the constructed web service response to a source of the received web service request.

14. The apparatus as set forth in claim 13 wherein the one or more processors are further configured to execute one or more programmed instructions comprising and stored in the memory to set one or more cookies based on the constructed web service response.

15. The apparatus as set forth in claim 13 wherein the one or more processors are further configured to execute one or more programmed instructions comprising and stored in the memory to provide an error message to the source of the received web service request as a web service response when there is no determined JavaScript file associated with the received web service request.

16. The apparatus as set forth in claim 13 further comprising at least one of a web service automator module, a web content optimization module, or a JavaScript environment emulator.

17. The apparatus as set forth in claim 16 wherein the JavaScript environment emulator is configured to make asynchronous JavaScript and XML (Ajax) calls and execute web site transactions corresponding to functionality implemented by one or more web services.

18. The apparatus as set forth in claim 13 wherein the received web service request comprises at least one of a GET HTTP request, a POST HTTP request, a PUT HTTP request, or a DELETE HTTP request; and
wherein the one or more parameters of the received web service request comprises a user name value or a password value.

19. The apparatus as set forth in claim 13 wherein the received web service request and the constructed web service response contain cookie and set-cookie headers, respectively.

20. The medium as set forth in claim 8 wherein the web content proxy server comprises at least one of a web service automator module, a web content optimization module, or a JavaScript environment emulator.

21. The medium as set forth in claim 8 wherein the JavaScript environment emulator is configured to make asynchronous JavaScript and XML (Ajax) calls and execute web site transactions corresponding to functionality implemented by one or more web services.

* * * * *